United States Patent [19]

Rodgers et al.

[11] Patent Number: 4,661,656
[45] Date of Patent: Apr. 28, 1987

[54] GRAPHIC TABLET AND METHOD

[75] Inventors: James L. Rodgers, Mesa; Billy C. Fowler, Scottsdale, both of Ariz.

[73] Assignee: Kurta Corporation, Phoenix, Ariz.

[21] Appl. No.: 819,392

[22] Filed: Jan. 16, 1986

[51] Int. Cl.$^4$ .................................. G08C 21/00
[52] U.S. Cl. ............................................. 178/18
[58] Field of Search .................... 178/18, 19; 324/208

[56] References Cited

U.S. PATENT DOCUMENTS

| | | | |
|---|---|---|---|
| 3,735,044 | 5/1973 | Centner et al. | 178/19 |
| 3,819,857 | 6/1974 | Inokuchi | 178/19 |
| 3,904,822 | 9/1975 | Kamm et al. | 178/19 |
| 4,081,603 | 3/1978 | Davis et al. | 178/19 |
| 4,210,775 | 7/1980 | Rodgers et al. | 178/19 |
| 4,552,991 | 11/1985 | Hulls | 178/19 |

Primary Examiner—Stafford D. Schreyer
Attorney, Agent, or Firm—Cahill, Sutton & Thomas

[57] ABSTRACT

A graphic tablet and method is described having a plurality of orthogonally related sensing conductors imbedded in the surface of a tablet. The imbedded sensing conductors thus form an X and Y grid for receiving signals from a signal radiating pen. The signals induced in the imbedded sensing conductors are detected, operated upon, and digitized to form an address of the radiating pen. The sensing conductors are formed of three conductors for each of the X and Y directions; the conductors extend across the pad in a given direction and are then redirected back across the pad in the opposite direction. Each of the X and Y sensing conductors thus extend back and forth across the pad forming parallel adjacent segments. A plurality of auxiliary conductors are each connected through resistors to a respective sensing conductor at spaced points along the sensing conductors length. Signals induced in the sensing conductor thus result in auxiliary signals in the auxiliary conductor. The position of a radiating pen on the surface of the tablet is determined by sensing the signals induced in the respective conductors, then determining the position of the pen with respect to the segments closest to the pen, and then determining the position of those segments on the tablet by reference to the auxiliary signals on the auxiliary conductors.

7 Claims, 5 Drawing Figures

GRAPHIC TABLET AND METHOD

BACKGROUND OF THE INVENTION

1. Field of the Invention

The present invention relates to graphic tablets, and more particularly, to a tablet of the type incorporating grid wires therein and positioned beneath the surface of a tablet for receiving signals radiated from a pen.

2. Prior Art

A great variety of devices have been disclosed in the prior art for ascertaining the position of a pen on a graphic surface. These prior art techniques include the generation and radiation of electromagnetic waves as well as the radiation of electric waves. Typically, the prior art includes a means for applying power to the tablet with the pen being used as a receiving antenna for detecting the presence of a radiated signal in time and phase related to the generation of the signal in the tablet. For example, U.S. Pat. No. 3,767,858 incorporates the generation of signals supplied to the grid wires in the tablet; the signals supplied to the grid wires vary in frequency and phase. The electro-static field is sensed by the pen and is converted into an output that corresponds to the physical position of the pen apparatus. The apparatus described in this patent includes the use of two separate signal frequencies to separate the composite signals picked up by the pen; the signals are subsequently processed by separate phase-locked loops.

U.S. Pat. No. 3,851,097 discloses apparatus employing a phase-shifting technique similar to that described in U.S. Pat. No. 3,767,858, and uses phase-locked loops and frequency phase-shifts as a means for converting the position of the pen on the surface into corresponding electrical output signals. The system operates by the detection of the phase shift that occurs across the graphic surface in both X and Y directions by means of a phase-locked loop to detect the difference between the signal picked up by the pen and a reference frequency and phase source.

U.S. Pat. No. 3,886,311 discloses a pen and corresponding tablet surface employed for graphic communication. A pen capacitively picks up an electro-static field from the surface for the purpose of sensing location of the pen relative to the electrostatic field. The position of the pen is determined in terms of X and Y coordinates and provides an output signal in response to the position of the pen. The apparatus also discloses means for loading a writing element or ballpoint cartridge element by a side-loading method and discloses the use of the ballpoint element for writing on paper that may be placed on the graphic surface.

U.S. Pat. No. 3,983,222 discloses a method and apparatus for converting the position of a pen on a surface into corresponding output signals. The system involves the use of a phase-shift across the surface employing an electrostatic field for transmission to a receiving pen. The pen, in turn, provides an output signal to circuitry that resolves the position of the pen on the surface. Specifically, the system involves the use of phase-shift and frequency change in a servo system incorporating a phase-locked loop and error detector to determine the displacement of the pen from a central location on the surface of the tablet. In addition, the apparatus references the frequency and phase of the signal picked up by the pen with an internal reference in the phase-locked loop and includes a bandpass filter element that converts frequency shift into phase shift. The system operates in a servo mode in which the pen movement away from its center position, in both X and Y directions, creates an error signal that results in a frequency change in a phase-locked loop. The frequency changes in such a fashion as to attempt to minimize the net phase-shift at any position in which the pen may be located. It constitutes an electrostatic closed-loop feedback means of pen position detection with respect to the apparatus of U.S. Pat. Nos. 3,878,858, 3,886,311 and 3,851,097.

U.S. Pat. No. 4,022,971 discloses another graphic communication system employing X and Y conductors in the graphic surface that generate an electrostatic field; the resultant electric field is sensed by a pen employing a phase-shift and a servo system that is substantially the same as those described in the previously discussed patents. However, the apparatus also employs a means to switch the location of the active grid elements in the surface from location to location so that the actual active area of the surface is limited to a small portion of the total graphic surface. Multiplexing circuitry is employed, in addition to the basic graphic methods previously described, to move the writing surface essentially from one position to another so that the pen is always located over an active surface area. The apparatus employs an electric signal fed to grid elements consisting of X and Y conductors that are sensed by the pen; by means of measurement of error detection of frequency and phase-shift an output signal is created that corresponds to the pen location o the total surface.

U.S. Pat. No. 4,492,819 discloses a graphic tablet and method wherein a pen acting as a radiating antenna is used for determining the location of the pen on a writing tablet comprising a plurality of orthogonally related conductors imbedded in the surface thereof. The signals generated in the respective conductors are sequentially connected to a detector which provides input signals to a dual slope integrator for ratioing the amplitude of the signal appearing at selected terminals. The output of the integrator is a timed wave form having a time value proportional to the position of the pen on the tablet's surface.

It is also known in the prior art to utilize a radiating pen to induce signals in conductors imbedded in the surface of the graphic tablet. The conductors are divided into two groups, the first of which are sensing conductors (three in number) and the second of which are auxiliary conductors each associated with a different one of the sensing conductors. The signals induced in the sensing conductors are manipulated by determining the ratio of the signal levels on adjacent conductors located on either side of the pen position. The location of the respective conductors may be determined by sensing the conductor having the largest signal level thereon and ratioing it with its corresponding auxiliary conductor signal level. This technique will be described more fully hereinafter.

OBJECTS OF THE INVENTION

It is therefore an object of the present invention to provide a method and apparatus for converting the position of a pen or cursor on a surface into output signals proportional to that position.

It is another object of the present invention to provide a method and apparatus for transmitting a signal by a pen or cursor and for receiving that signal through a plurality of conductors imbedded in the surface of a tablet with the subsequent processing of those signals to derive a digital signal corresponding to the position of the pen on the tablet's surface.

It is still another object of the present invention to provide a method and apparatus for determining the position of a radiating pen or cursor on the surface of the graphic tablet without having to limit the physical size of the surface of the tablet.

It is still another object of the present invention to provide a method and apparatus for deriving the digital address of a radiating pen on the surface of a graphic tablet without limitations on the size of the graphic tablet and without sacrificing the accuracy and resolution of the pen address.

These and other objects of the present invention will become apparent to those skilled in the art as the description thereof proceeds.

SUMMARY OF THE INVENTION

Briefly, and in accordance with the embodiment chosen for illustration, a graphic tablet is formed having a plurality of conductors imbedded in the surface. Three conductors are provided for determining the X position of a radiating pen or cursor. Similarly, three conductors are provided for determining the Y position of the pen. The three X conductors or sensing conductors, extend in a given direction across the tablet parallel with each other. The three conductors are then wound back and forth across the surface of the tablet to form interleaved parallel adjacent segments. One end of each of the conductors is grounded and the opposite end is provided for connection to a selector circuit. Three auxiliary conductors, one each dedicated to a respective different one of the sensing conductors, is provided. Each of the auxiliary conductors is connected to its corresponding sensing conductor through resistors connected between the auxiliary conductor and selected points along the length of the sensing conductor.

When a radiating pen or cursor is placed on the surface of the tablet, signals are induced in the adjacent parallel segments of the sensing conductors. The sensing conductor with the lowest signal level thereon and the adjacent sensing conductor having the next lowest signal level thereon and having a polarity reversal is then utilized to form a ratio indicative of the distance of the radiating pen from the conductor with the lowest signal thereon. To determine which segments of the respective sensing conductors are nearest the radiating pen, the sensing conductor having the highest signal level thereon is utilized to form a ratio with the signal on the auxiliary conductor corresponding to the sensing conductor with the highest signal level. This ratio will represent a course address of the pen position, while the previously mentioned ratio will represent the fine address of the pen position.

To permit the graphic tablet to be enlarged without loss of accuracy or resolution, additional auxiliary conductors are connected to each of the sensing conductors as the tablet is made larger. To determine an area address for the pen position, all of the auxiliary conductor signals corresponding to the sensing conductor having the largest signal thereon are compared to find that auxiliary conductor signal falling within a preselected range of values. Having found the appropriate auxiliary conductor, the area address, the course position address, and the fine position address may be combined to provide a single address for the pen position on the tablet without regard to tablet size. The same procedure is of course followed for determining the Y position address of the pen.

The present invention may more readily be described with reference to the accompanying drawings in which.

The present invention is described in terms of electromagnetic signals being radiated from a cursor or pen. It will be obvious to those skilled in the art that other forms of radiated signals may be incorporated in the system and technique of the present invention. For example, an electric field or a magnetic field or a combination signal such as a radio field may be used as the radiated signal. The tablet described in the embodiment chosen for illustration will of course be modified to accommodate the type of radiated signal chosen.

DETAILED DESCRIPTION OF THE PREFERRED EMBODIMENT

Figure 1:
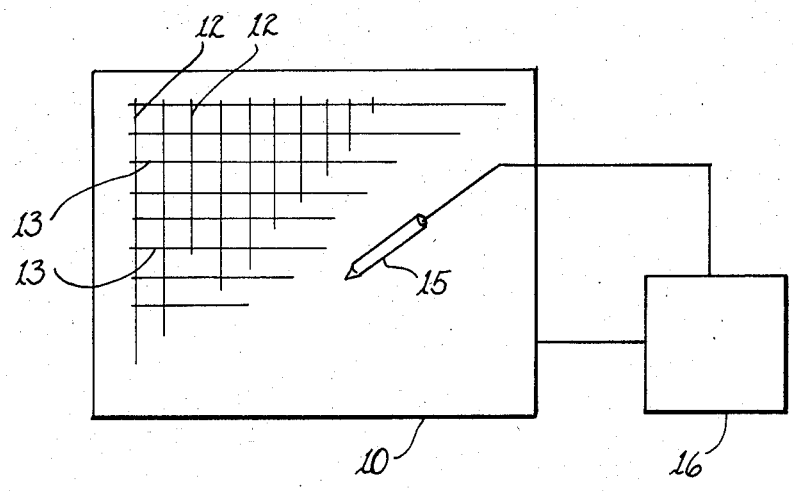
FIG. 1 is a schematic illustration of the graphic tablet and radiating pen of the type incorporating the teachings of the present invention.

Referring to FIG. 1, a graphic tablet 10 is shown incorporating a plurality of X sensing conductors 12 and a plurality of Y sensing conductors 13. The sensing conductors are shown schematically and, as will be described more completely hereinafter, are actually grouped into three wires in each of the X and Y directions that are extended back and forth across the surface of the tablet 10. The sensing conductors 12 and 13 may be imbedded in the surface of the tablet and are insulated from each other.

A pen 15, whose position is to be determined, radiates a signal of predetermined frequency into the surface of the tablet pen to thereby induce signals in the sensing conductors. The embodiment chosen for illustration will assume that the signals being radiated and sensed are electromagnetic; however, it will be obvious to those skilled in the art that modifications can be made to the described embodiment to permit use of electric signals as well as electromagnetic. The pen 15 may be used to write on paper appropriately placed on the surface of the tablet 10. Further, the pen 15 may be replaced by a cursor in a manner known to those skilled in the art. The signals thus radiated from the pen 15 induce signals in corresponding sensing conductors 12 and 13. The manipulation of the sensed signals, as well as the overall control of the system, is achieved through a control system 16 connected to the pen 15 and the tablet 10.

Figure 2:
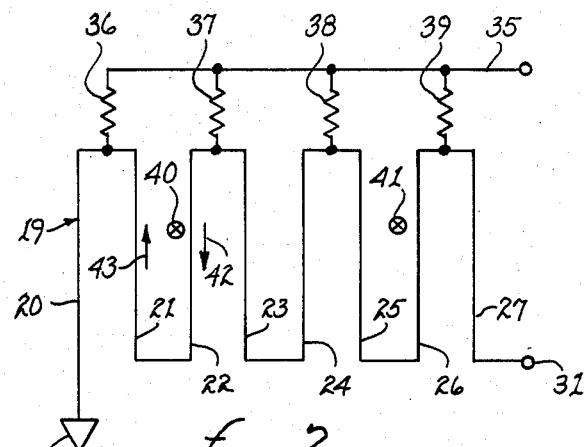
FIG. 2 is a schematic circuit diagram useful in describing the system of the present invention.

Referring now to FIG. 2, a portion of a single sensing conductor is shown together with a corresponding auxiliary conductor; description of FIG. 2 will facilitate the understanding of the embodiment chosen for illustration. A conductor 19 is shown extending back and forth within the surface of a tablet (not shown). The conductor 19, thus extending back and forth, forms parallel segments 20 through 27. One end of the conductor 19 is grounded at 30 and the opposite end 31 may be connected to a detection circuit for detecting the presence of a sensed signal. An auxiliary conductor 35 is connected to the sensing conductor 19 along the latter's length through a plurality of resistors 36 through 39. The conductor 35 may also be connected to a sensing circuit for detecting the presence of a signal thereon and that signal's amplitude. If a radiation source, such as a pen, were placed at a location indicated by the circle 40, a signal level would be induced into the sensing conductor 19. Since the end 30 of the conductor 19 is grounded, no voltage would appear at the connection between the conductor 19 and the resistor 36; however, a voltage would appear at the junctures of the conductor 19 and the resistors 37, 38 and 39. A voltage would thus appear on the auxiliary conductor 35 as well as on the sensing conductor 19.

If the position of the radiating source or pen were moved to the position shown by the circle 41, a signal would be induced into the sensing conductor 19. Since the left-hand portion of the conductor 19 is grounded, no voltage would be present at the juncture between the conductor 19 and the resistors 36, 37 and 38; however, a voltage would be present at the junction of the conductor 19 and the resistor 39. Thus, with the source of radiation being positioned at 41, a signal will appear on the conductor 35 and on the sensing conductor 19. As the radiating pen or cursor is moved to the right from the position 40 to the position 41, the signal level on the conductor 35 will decrease. The signal on the conductor 19 will vary depending on the proximity of the radiating source to any one of the segments 20 through 27. That is, assuming electromagnetic radiation, the signal level on the conductor 19 will vary from a maximum when the radiating source is precisely midway between adjacent segments to zero when the radiating source is directly over a segment. It may also be noted that a polarity change occurs each time the radiating signal source is moved past one of the sensing conductor segments. For example, using conventional notation and assuming that the electromagnetic field is directed downwardly through the surface of the drawing at the point 40, the polarity of the signal in the conductor 19 is indicated by the directional arrows 42 and 43. If the radiating signal source were moved to the right of the segment 22, the polarity of the induced signal would be reversed.

In the technique illustrated by FIG. 2, a single sensing conductor 19 is shown with its corresponding auxiliary conductor 35. In practice, three such sensing conductors (for each of the X and Y directions) extend parallel to each other and are wound back and forth in a manner similar to the conductor 19 shown in FIG. 2. The resulting interleaved parallel segments of the three conductors form a means for determining the precise location of a radiating source relative to the parallel segments of the three interleaved conductors. The corresponding auxiliary conductors provided for each of the sensing conductors respectively provide a means for determining the location of the segments that are the closest to the radiating source.

Figure 3:
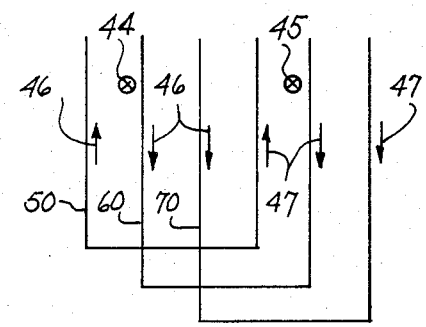
FIG. 3 is a circuit diagram useful in describing the operation of the present invention.

Thus, the utilization of auxiliary conductors connected through resistors to corresponding sensing conductors can yield an indication of the course position of the radiating source. The determination of the "fine" position may be described in connection with FIG. 3. Three sensing conductors 50, 60 and 70 are shown, each wound back upon itself and, in actual practice, will extend the width or height of the graphic tablet. The portion of the conductor shown in FIG. 3 is useful in the description of the technique used to determine radiating source or pen position. It may be noted that each conductor 50, 60 and 70 is folded back upon itself to therefore provide parallel conductor segments adjacent to and interleaved with the other sensing conductors. Again assuming that the system chosen for illustration is operating under electromagnetic principles, an electromagnetic radiating pen position such as that shown by the circle 44 in FIG. 3 will result in induced signals in conductors 50, 60 and 70. If the instantaneous direction of the electromagnetic signal is directed into the drawing, the induced signal polarities are shown by the arrows 46. Thus, if the radiating pen is in the position shown at 44, it is known that the signal on conductor 60 is the smallest of the three conductors (it is the closest to the electromagnetic radiation source), the signal on the sensing conductor 50 is next smallest with its polarity changed with respect to the signal on conductor 60, and the signal present on conductor 70 is the largest of the three. With the above information it is known that the position of the radiating pen is between the conductors 50 and 60 and that its position can be determined by forming a ratio of the signal strengths on the two conductors. That is, the level of the signal on conductor 60 divided by the level of the signal on the conductor 50 times a scale factor will equal the position of the radiating pen to the left of the conductor 60. It may be noted however, that a point of ambiguity exists since the pen, if placed at the position shown at 45, will result in the same position information. That is, the ratio of signal levels will place the pen to the left of conductor 60. However, it may also be noted that the signal polarity on the conductor 60 is reversed when the pen is placed at position 45 rather than 44. Therefore, the position of the radiating source such as the radiating pen can be located positively with respect to the conductors 50, 60 and 70 within a group of segments of the respective conductors.

To determine which group of segments in which the pen is located, the procedure used in connection with FIG. 2 is used. That is, the signal on an auxiliary conductor is compared to the signal existing on the sensing conductor having the signal of greatest level; a ratio of the sensing conductor signal and auxiliary conductor signal is then formed which presents a value indicative of the location of the group of segments within which the pen is located.

Figure 4:
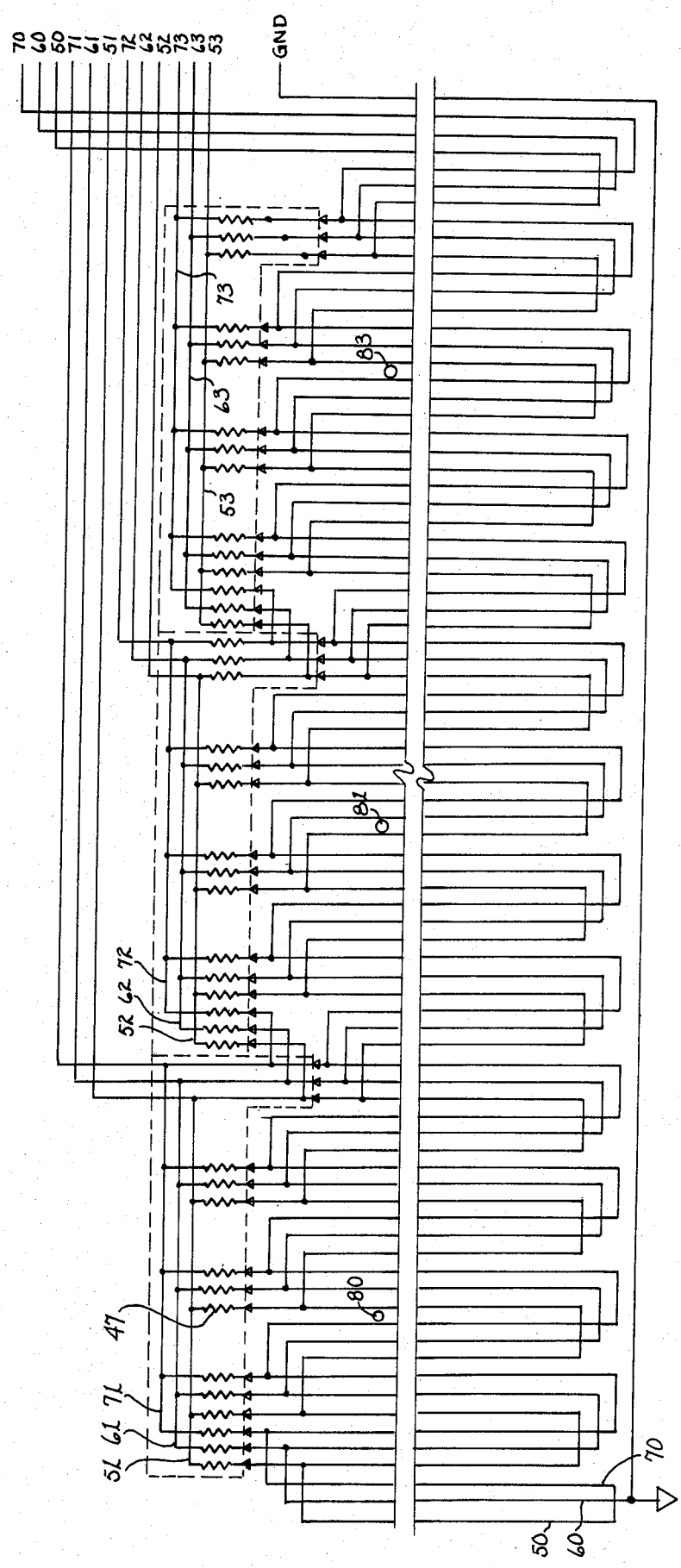
FIG. 4 is a schematic circuit diagram of graphic tablet showing the sensing conductors and auxiliary conductors in accordance with the teachings of the present invention.

The above technique using three conductors wound back and forth across a graphic tablet to detect the signal being radiated by a radiating pen is known in the art. Further, sensing the signal level on the respective sensing conductors to form a ratio to locate the pen within the group of segments is also known as is the technique for locating the particular group of segments. However, the above technique performs satisfactorily for graphic tablets of modest size. When tablets of greater size (in excess of approximately eighteen inches) are required, it is no longer possible to provide the required resolution. Accordingly, the present invention incorporates a plurality of auxiliary conductors for each sensing conductor to enable the detection of the group of segments within which a pen or radiating device is located without limitation as to the size of the surface or the extent of the surface of a graphic tablet. Referring now to FIG. 4, a graphic tablet constructed in accordance with the teachings of the present invention is shown. In keeping with the explanation of FIG. 3, three sensing conductors 50, 60 and 70 are shown and are wound back and forth across the surface of the graphic tablet. It may be noted that the conductors in FIG. 4 extend vertically and are therefore the conductors utilized to sense the X position of the radiating device or pen. Further, the conductors are shown broken at approximately their mid point since the conductors would have substantially greater vertical extent than shown in the drawing. By following one of the sensing conductors, conductor 50 for example, it may be seen that as the conductor traverses the height of the tablet and begins its descent to form a second segment, the conductor is connected through a resistor 47 to an auxiliary conductor (in the case of conductor 50 the auxiliary conductor is conductor 51). In a manner described in connection with FIG. 2, each successive segment of the sensing conductor 50 is oined through a resistor to the auxiliary conductor 51 corresponding to the sensing condutor 50. Similarly, sensing conductor 60 is connected at one end of its successive segments through a resistor 47 to its corresponding auxiliary conductor 61. Sensing conductor 70 is also connected at the end of its successive parallel segments to auxiliary conductor 71. Thus, a radiating device such as a pen placed at the position indicated at 80 will result in the determination of the position of the radiating device with respect to the sensing conductors 50, 60 and 70; the sensing signals are delivered to the terminals shown at the right of FIG. 4 and designated by the same reference numerals as the conductors. We will therefore know at this point the position of the radiating device with respect to the sensing conductors 50, 60 and 70; however, the determination of the respective segments of the corresponding sensing conductors must be determined by sensing which of the sensing conductors has the highest level signal thereon, and forming a ratio of that signal level with the signal level existing on the auxiliary conductor for that sensing conductor. For example, if we assume the signal level on conductor 60 is the largest of the three conductors 50, 60 and 70, then the ratio of that signal level to the signal level on the auxiliary conductor 61 will provide an indication of the group of segments within which the radiating device is located. The address of the group of segments plus the address of the position within the segments represents the total address of the pen position. It may be noted that the above discussion is valid only insofar as the pen position, shown at 80 in FIG. 4, is located within a graphic tablet of relatively modest size. As indicated previously, FIG. 4 is representative of graphic tablets in excess of the nominal size and represents a technique that can be used to expand the size of the tablet to any significant size without sacrificing accuracy or resolution.

The utilization of auxiliary conductors 51, 61 and 71 provides a means for determining the position of the group of segments only at the left-hand side of the tablet (as shown in FIG. 4). To provide a means for finding the position of a pen or cursor elsewhere on the large graphic tablet, a second and a third set of auxiliary conductors are provided. In the embodiment for illustration only three sets of auxiliary conductors are provided for each sensing conductor; it will be obvious that additional auxiliary conductors may be provided for each sensing conductor to enlarge the graphic tablet.

If the pen or cursor is moved to the position indicated by the circle 81, the determination of the position of the pen with respect to the sensing conductors 50, 60 and 70 will be the same as discussed above in connection with the location of a radiating device with respect to the three sensing conductors. To determine which group of segments the sensing device is located at, the signals appearing at the auxiliary conductors corresponding to the sensing conductor with the largest signal thereon are evaluated. Again, assuming that the sensing conductor 60 is the conductor having the largest signal level thereon, then the signals present on auxiliary conductors 61, 62 and 63 are evaluated. Since the left-hand side of each of the sensing conductors is grounded, and since the position of the pen in the present example is at the point 81, it will be apparent that no signal will be provided to the auxiliary conductor 61. That is, since the position 81 is to the right of all of the segments of the sensing conductor 60 that are connected to the auxiliary conductor 61, the auxiliary conductor 61 is effectively connected to ground. The level on the auxiliary conductor 62 will be above zero since the signal on that portion of the sensing conductor 60 connected to the auxiliary conductor 62 will be above zero on those portions of the sensing conductor to the right of the position 81 of the radiating device. Therefore, if the signal on the auxiliary conductor 62 falls within a predetermined range, its ratio with the signal on the sensing conductor 60 will determine the group of segments within which the position 81 may be found.

The same procedure and technique is used to locate the position of the radiating device or pen if it is moved further to the right to the position shown in FIG. 4 at 83. Again, assuming that the sensing conductor 60 exhibits the largest signal level thereon, the auxiliary conductor 63 will be the only auxiliary conductor connected to sensing conductor 60 (i.e., auxiliary conductors 61, 62 and 63) that will exhibit a signal level greater than zero and within the range of levels indicative of the existence of the radiating pen within the group of segments to which the auxiliary conductor is connected.

Figure 5:
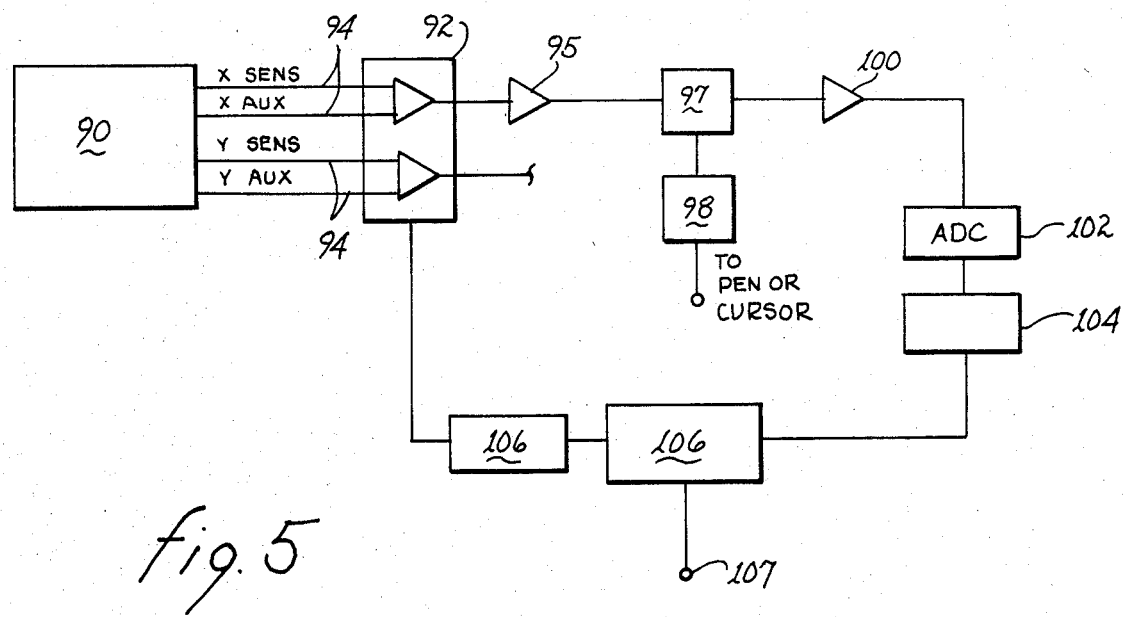
FIG. 5 is a functional block diagram illustrating the processing of the signals induced in the conductors of the tablet.

The processing of the signals on the sensing conductors and the auxiliary conductors may be accomplished in a manner to be described in connection with FIG. 5. Referring to FIG. 5, the tablet 90 is connected to a signal selector amplifier 92 through the X and Y sensing and auxiliary conductors 94. The X and Y signals are separately processed; the diagram of FIG. 5 shows the processing of only the X signals, it being understood that identical processing is provided for the Y signals. The X signal is amplified and bandpass filtered in filter/amplifier 95 and supplied to a synchronous detector 97. The synchronous detector receives a reference signal from a reference source 98 that also supplies a reference signal to the pen or cursor.

The signal level derived from the synchronous detector is passed through a low pass filter amplifier 100 and supplied to an analog-to-digital converter 102. The digitized information is supplied through a counter buffer 104 to microprocessor 105. The processor performs operations upon the digitized signals in accordance with program control to provide a digitized position output at terminal 107 indicative of the pen position on the tablet surface. A system counter 106 provides a system count to dictate the number of conversions of the signal levels to digital addresses per second. The function of the counter 106 could be performed by the microprocessor in other embodiments.

The circuits forming the amplifiers, filters, detectors and converters may be standard readily available commercial circuit chips and devices. For example, the microprocessor 105 may be chosen from a variety of such devices and may be found in the marketplace under the designation Zilog Z8, and the selectors are standard circuits known by the designation CD 4051. The analog-to-digital converter 102 may take numerous forms and may implement a digitizing technique described in U.S. Pat. No. 4,492,819.

The method thus implemented includes the sensing of the signals present on the three sensing conductors and selecting that conductor having a lowest signal strength thereon. The adjacent conductor having the next lowest signal strength is selected and the ratio of their signal levels is formed to provide an indication of the location of the radiating source or pen between the two conductors. The value of the ratio may thus be considered a fine address of the pen position. To determine the location of the sensing conductor segment, the sensing conductor having the largest signal level thereon is used to form a ratio with one of the auxiliary conductors connected to that sensing conductor. The signal levels present on the auxiliary conductors connected to the single sensing conductor are compared to a preselected signal level to determine that auxiliary conductor having a signal level greater than zero and within the range of signal levels indicative of the existence of the radiating pen. Therefore, the large area address of the pen will be known and a ratio is formed of the signal levels on the auxiliary conductor having the signal level in the desired range with the signal level on the sensing conductor having the highest signal level thereon. The latter technique provides a course address for the pen position. The area address, the course address, and the fine address all form the complete address or location of the pen on the tablet surface.

For example, referring to FIG. 4, and assuming that the pen position is at the point 81 and that the pen is closest to the sensing conductor 60 and located between the sensing conductors 50 and 60. The location of the pen is determined by sensing the signal levels on the three sensing conductors 50, 60 and 70, since the pen is closest to the sensing conductor 60, the signal level on conductor 60 will be the lowest of the three. Further, since the pen is located between the conductors 50 and 60, the next lowest signal level will be on conductor 50. These two signal levels are sensed, converted to a DC signal level, digitized and used to form a ratio as follows $$\frac{V_{60}}{V_{50}} + K = \text{fine address}$$

to represent the distance of the pen location from the conductor 60. This position information is the fine address. In accordance with the problem chosen as the example, the signal level on the sensing conductor 70 is the highest of the three. The auxiliary conductors connected to the sensing conductor 70 (auxiliary conductors 71, 72 and 73) are sensed to determine the signal levels thereon. Auxiliary conductor 71 is connected to the sensing conductor 70 only at the left-hand portion of FIG. 4 and is thus connected to the conductor 70 only to the left of the signal being injected into the tablet at the point 81. Accordingly, since the left-hand portion of the sensing conductor 70 is grounded, there will be effectively no signal supplied to the auxiliary conductor 71 and it is thus known that the pen position can not be located in the area of the tablet located to the left of FIG. 4.

Auxiliary conductor 72 will have a signal thereon greater than zero but less than the maximum. Since the auxiliary conductor 72 is connected to the sensing conductor 70 around the middle portion of FIG. 4, that is around the location 81 of the pen, a signal level will be generated in the auxiliary conductor 72 as a result of the connection between the auxiliary conductor 72 and sensing conductor 70; however, the signal will be supplied to the auxiliary conductor 72 only through those resistors 47 to the right of the position 81 of the pen. Thus, the signal level on the auxiliary conductor 72 will be above zero but below the maximum possible signal level for an auxiliary conductor. In contrast, the signal level on conductor 73 will be a maximum since all of its connections to the sensing conductor are to the right of the pen position. The condition of conductor 72, that is the existence of a signal level above zero but below the maximum possible, is an indication that the signal source, the pen or cursor, is located in that area serviced by that auxiliary conductor. Plus, in the example chosen for illustration and with reference to FIG. 4, it will be known that the pen location is in the area serviced by the auxiliary conductor 72. In other words, the pen location is in the middle area of the tablet of FIG. 4. The determination has now been made of the area address of the pen position (the middle portion of FIG. 4) and the fine address of the pen (the specific location of the pen between conductors 50 and 60). The course address of the pen must now be determined to obtain the complete address of the pen.

To determine the course address, the ratio of the signal strength on the sensing conductor 70 with the signal strength on the auxiliary conductor 72 is formed. This ratio effectively becomes the address of the segment of the sensing conductor 60 which is the closest to the pen position. The complete address of the pen position is thus formed by the combination of the area address (which places the pen position in the middle portion of FIG. 4), the course address (which indicates which of the segments of conductor 60 is the closest to the pen) and the fine address (the actual distance of the pen position from the sensing conductor 60). It may be seen that the tablet incorporating the teachings illustrated in FIG. 4 may be expanded to include additional areas without sacrificing the ability to formulate a precise address of a pen position. The addition of successive areas to the tablet merely requires the incorporation of additional auxiliary conductors for each new area. Of course, the above example, including reference to FIG. 4, only includes the generation of X address of the pen position. It will be obvious to those skilled in the art that orthogonally related conductors are used to produce the Y address of the pen position.

We claim:

1. In a graphic tablet having a surface and a means for detecting the position of a signal radiating device near or on said surface, the improvement comprising:
   (a) a plurality of sensing conductors secured adjacent said surface each comprising a series of parallel segments connected at alternate ends to form a continuous conductor with one end thereof grounded, the parallel segments of the respective sensing conductors being interleaved to form adjacent parallel segments extending across said tablet;

(b) a plurality of groups of auxiliary conductors, each group corresponding to a different one of said sensing conductors;

(c) a first auxiliary conductor in each group of auxiliary conductors connected to a corresponding one of said sensing conductors along a portion of the length of said sensing conductor through resistors at each of the alternate ends of said portion of said sensing conductor; and (d) a second auxiliary conductor in each group of auxiliary conductors connected to said corresponding one of said sensing conductors along another portion of the length of one of said sensing conductors through resistors at each end of the alternate ends of said corresponding one of said sensing conductors.

2. A graphic tablet having a surface and means for detecting the X position of a signal radiating device near or on said surface, the improvement comprising:

(a) three X sensing conductors secured adjacent said surface each comprising a series of parallel segments connected at alternate ends to form a continuous conductor with one end thereof grounded, the parallel segments of the respective X sensing conductors being interleaved to form adjacent parallel segments extending across said tablet;

(b) a plurality of groups of X position auxiliary conductors each group corresponding to a different one of said X sensing conductors;

(c) a first X position auxiliary conductor in each group connected to a corresponding one of said X sensing conductors along a portion of the length of said X sensing conductor through resistors at each of the alternate ends of said X sensing conductor portion; and (d) a second X position auxiliary conductor in each group connected to said corresponding one of said X sensing conductors along a portion of the length of said X sensing conductor through resistors at each of the alternate ends of said X sensing conductor portion.

3. A graphic tablet having a surface and a means for detecting the position of a signal radiating device near or on said surface, the improvement comprising:

(a) three X sensing conductors secured adjacent said surface each comprising a series of parallel segments connected at alternate ends to form a continuous conductor with one end thereof grounded, the parallel segments of the respective X sensing conductors being interleaved to form adjacent parallel segments extending across said tablet;

(b) a plurality of groups of X position auxiliary conductors each group corresponding to a different one of said X sensing conductors;

(c) a first X position auxiliary conductor in each group connected to a corresponding one of said X sensing conductors along a portion of the length of said X sensing conductor through resistors at each of the alternate ends of said X sensing conductor portion;

(d) a second X position auxiliary conductor in each group connected to said corresponding one of said X sensing conductors along a portion of the length of said X sensing conductor through resistors at each of the alternate ends of said X sensing conductor portion.

(e) three Y sensing conductors secured adjacent said surface each comprising a series of parallel segments connected at alternate ends to form a continuous conductor with one end thereof grounded, the parallel segments of the respective Y sensing conductors being interleaved to form adjacent parallel segments extending across said tablet;

(f) a plurality of groups of Y position auxiliary conductors each group corresponding to a different one of said Y sensing conductors;

(g) a first Y position auxiliary conductor in each group connected to a corresponding one of said Y sensing conductors along a portion of the length of said Y sensing conductor through resistors at each of the alternate ends of said Y sensing conductor portion; and (h) a second Y position auxiliary conductor in each group connected to said corresponding one of said Y sensing conductors along a portion of the length of said Y sensing conductor through resistors at each of the alternate ends of said Y sensing conductor portion.

4. In a graphic tablet having a surface and a means for detecting the position of a signal radiating device near or on said surface, the improvement comprising:

(a) a plurality of sensing conductors secured adjacent said surface each comprising a series of parallel segments connected at alternate ends to form a continuous conductor with one end thereof grounded, the parallel segments of the respective sensing conductors being interleaved to form adjacent parallel segments extending across said tablet;

(b) a plurality of groups of auxiliary conductors, each group corresponding to a different one of said sensing conductors; and (c) each auxiliary conductor within each group of auxiliary conductors connected to a different portion of the corresponding sensing conductor through resistors connected to said alternate ends of said corresponding sensing conductor.

5. A method of determining the position of a signal radiating device on the surface of a graphic tablet having a plurality of sensing conductors secured adjacent said surface, said sensing conductors extending back and forth across the tablet to form parallel segments, and having a plurality of groups of auxiliary conductors each group connected to a different one of said sensing conductors along the length thereof:

(a) selecting a first sensing conductor having a signal amplitude thereon;

(b) selecting a second sensing conductor adjacent said first sensing conductor having a different signal amplitude thereon;

(c) dividing the amplitude of the signal on said first conductor by the amplitude of the signal on said second conductor to form a ratio proportional to the distance from said first conductor to said radiating device;

(d) sensing the amplitude of the signals on each of the auxiliary conductors corresponding to one of said sensing conductors and selecting which of the auxiliary conductors has a signal having an amplitude thereon falling within a predetermined range of signal amplitudes; and (e) measuring the amplitude of the signal on the selected auxiliary conductor and forming a ratio of that signal with the signal level on the corresponding sensing conductor.

6. A method of determining the position of a signal radiating device on the surface of a graphic tablet having a plurality of sensing conductors secured adjacent said surface, said sensing conductors extending back and forth across the tablet to form parallel segments, and having a plurality of groups of auxiliary conductors each group connected to a different one of said sensing conductors along the length thereof:

(a) selecting a first sensing conductor having a lowest signal amplitude thereon;

(b) selecting a second sensing conductor adjacent said first sensing conductor having a next lowest signal amplitude thereon;

(c) dividing the amplitude of the signal on said first conductor by the amplitude of the signal on said second conductor to form a ratio proportional to the distance from said first conductor to said radiating device;

(d) sensing the amplitude of the signals on each of the auxiliary conductors corresponding to the sensing conductor having the largest signal amplitude thereon and selecting which of the auxiliary conductors has a signal having an amplitude thereon falling within a predetermined range of signal amplitudes; and (e) measuring the amplitude of the signal on the selected auxiliary conductor and forming a ratio of that signal with the signal level on the sensing conductor having the highest signal level thereon.

7. A method of determining the position of a signal radiating device on the surface of a graphic tablet having a plurality of X and Y sensing conductors secured adjacent said surface, said sensing conductors extending back and forth across the tablet to form parallel segments with the X segments perpendicular to the Y segments, and having a plurality of groups of auxiliary X and Y conductors each X and Y group connected to a different one of said X and Y sensing conductors, respectively, along the length thereof, said method comprising the steps:

(a) selecting a first X sensing conductor having a lowest signal amplitude thereon;

(b) selecting a second X sensing conductor adjacent said first X sensing conductor having a next lowest signal amplitude thereon;

(c) dividing the amplitude of the signal on said first X sensing conductor by the amplitude of the signal on said second X sensing conductor to form a ratio proportional to the distance from said first X sensing conductor to said radiating device;

(d) sensing the amplitude of the signals on each of the auxiliary X conductors corresponding to the X sensing conductor having the largest signal amplitude thereon and selecting which of the auxiliary X conductors has a signal having an amplitude thereon falling within a predetermined range of signal amplitudes;

(e) measuring the amplitude of the signal on the selected auxiliary X conductor and forming a ratio of that signal with the signal level on the X sensing conductor having the highest signal level thereon;

(f) selecting a first Y sensing conductor having a lowest signal amplitude thereon;

(g) selecting a second Y sensing conductor adjacent said first Y sensing conductor having a next lowest signal amplitude thereon;

(h) dividing the amplitude of the signal on said first Y sensing conductor by the amplitude of the signal on said second Y sensing conductor to form a ratio proportional to the distance from said first Y sensing conductor to said radiating device;

(i) sensing the amplitude of the signals on each of the auxiliary Y conductors corresponding to the Y sensing conductor having the largest signal amplitude thereon and selecting which of the auxiliary Y conductors has a signal having an amplitude thereon falling within a predetermined range of signal amplitudes; and (j) measuring the amplitude of the signal on the selected auxiliary Y conductor and forming a ratio of that signal with the signal level on the Y sensing conductor having the highest signal level thereon.

* * * * *